United States Patent
Gaufin et al.

(10) Patent No.: US 9,267,562 B2
(45) Date of Patent: Feb. 23, 2016

(54) BRAKE CHAMBER STROKE INDICATOR SYSTEM AND METHOD

(71) Applicant: TSE BRAKES, INC., Cullman, AL (US)

(72) Inventors: Carl Gaufin, Hanceville, AL (US); Ryan Fechner, Madison, AL (US); Thomas Hewer, Cullman, AL (US)

(73) Assignee: TSE Brakes, Inc., Cullman, AL (US)

( * ) Notice: Subject to any disclaimer, the term of this patent is extended or adjusted under 35 U.S.C. 154(b) by 227 days.

(21) Appl. No.: 14/090,594

(22) Filed: Nov. 26, 2013

(65) Prior Publication Data
US 2014/0144367 A1 May 29, 2014

Related U.S. Application Data

(60) Provisional application No. 61/730,932, filed on Nov. 28, 2012.

(51) Int. Cl.
| | |
|---|---|
| *F16D 66/02* | (2006.01) |
| *F16D 65/28* | (2006.01) |
| *F16D 66/00* | (2006.01) |
| *F16D 121/08* | (2012.01) |

(52) U.S. Cl.
CPC ............... *F16D 66/02* (2013.01); *F16D 65/28* (2013.01); *F16D 66/00* (2013.01); *F16D 2066/003* (2013.01); *F16D 2121/08* (2013.01)

(58) Field of Classification Search
CPC ......... F16D 65/28; F16D 66/00; F16D 66/02; F16D 2066/003; F16D 2121/08
USPC .......... 116/208, 281, 283, 285, 298; 188/1.11 R, 1.11 W, 1.11 L; 33/609, 33/610; 92/5 R, 5 L
See application file for complete search history.

(56) References Cited

U.S. PATENT DOCUMENTS

| | | | | |
|---|---|---|---|---|
| 1,915,456 A | * | 6/1933 | Sumbs | G01F 23/0023 116/285 |
| 2,918,555 A | * | 12/1959 | Lindberg | H01H 19/025 116/286 |
| 4,279,214 A | * | 7/1981 | Thorn | F16D 66/02 116/208 |
| 4,945,818 A | | 8/1990 | Ware | |
| 4,989,537 A | * | 2/1991 | Hutchinson, Sr. | F16D 66/02 116/208 |
| 5,649,469 A | * | 7/1997 | Pierce | B60T 17/083 116/208 |
| 5,699,880 A | * | 12/1997 | Hockley | F16D 66/00 116/208 |

(Continued)

FOREIGN PATENT DOCUMENTS

| | | |
|---|---|---|
| GB | 441430 A | 1/1936 |
| GB | 2274316 A | 7/1994 |

OTHER PUBLICATIONS

Great Britain Search Report issued in Great Britain Patent Application No. 1320911.9 dated Jun. 18, 2014.

*Primary Examiner* — R. A. Smith
(74) *Attorney, Agent, or Firm* — Andrus Intellectual Property Law, LLP (57) ABSTRACT

A brake chamber stroke indicator system for a brake system including a brake air chamber includes an indicator rod or a string pot gauge including a housing with an indicator rotatably positioned within the housing. A string has a first end attached to the indicator of the string pot gauge. A spring urges the indicator to rotate in a first direction whereby the string is retracted into the housing. The second end of the string is attached to a brake push rod or a pressure plate. The indicator rod is mounted by a base onto a pressure plate.

28 Claims, 14 Drawing Sheets

(56) References Cited

U.S. PATENT DOCUMENTS

| | | | |
|---|---|---|---|
| 5,762,165 A | 6/1998 | Crewson | |
| 5,913,385 A | 6/1999 | Thibodeau | |
| 5,931,266 A | 8/1999 | Harrup | |
| 6,019,197 A | 2/2000 | Judson | |
| 6,082,502 A * | 7/2000 | Hawryszkow | B60T 17/228 188/1.11 R |
| 6,135,242 A | 10/2000 | Hockley | |
| 6,411,206 B1 | 6/2002 | Weant et al. | |
| 6,874,405 B2 * | 4/2005 | Fisher | B60T 17/08 92/17 |
| 7,222,699 B2 * | 5/2007 | Salazar | F16D 66/02 188/1.11 W |
| 8,387,758 B1 * | 3/2013 | Sawyer | B60T 17/221 188/1.11 L |
| 2004/0134344 A1 * | 7/2004 | Fisher | B60T 17/08 92/78 |
| 2008/0251004 A1 * | 10/2008 | Stradella | G01F 11/006 116/298 |
| 2011/0023703 A1 * | 2/2011 | Radowitz | B60T 17/088 92/63 |

* cited by examiner

Fig. 9 ial Patent
BRAKE CHAMBER STROKE INDICATOR SYSTEM AND METHOD

CLAIM OF PRIORITY

This application claims priority to U.S. Provisional Patent Application No. 61/730,932, filed Nov. 28, 2012, the contents of which are hereby incorporated by reference.

FIELD OF THE INVENTION

The present invention relates generally to vehicle braking systems and, in particular, to a stroke indicator system and method for the a braking system that indicates when the system is out of adjustment or in need of repair or servicing.

BACKGROUND

As is known in the art, an air brake system for a vehicle, typically includes an air chamber that, when the vehicle operator activates the brakes by pushing on the brake pedal, receives pressurized air to move a brake push rod that actuates a slack adjuster. As a result, a brake cam shaft is turned which causes the brake shoes of the system to engage brake drums at the wheels of the vehicle to slow or stop the vehicle. Over time, as the brakes are used, the brake push rod travel distance or stroke increases, eventually requiring readjustment of the brake system and/or replacement of components. As a result, various types of devices exist for monitoring the stroke of the brake push rod to provide a visual indication of an out of adjustment condition or excessive wear of vehicle brake components leading to brake failure.

An example of a prior art device for monitoring the stroke of a brake push rod is illustrated in U.S. Pat. No. 4,945,818 to Ware, where a visual marking or surface discontinuity is placed on the brake chamber pushrod. If the mark is visible when the brakes are applied, then the system is out of adjustment. Another example is provided in U.S. Pat. No. 6,411,206 to Weant et al., wherein an electronic stroke monitor system makes use of hall effect sensors to monitor a magnetic field to determine stroke. A sleeve is put around the base of the pushrod, and the signal is transmitted via radio frequencies. Another example is provided in U.S. Pat. No. 5,762,165 to Crewson, where an indicator is mounted to the slack adjuster and chamber clevis and visually shows the amount of stroke that has taken place when the brake is applied. Another example is provided is U.S. Pat. No. 5,913,385 to Thibodeau, where a bracket that is mounted to the chamber stud provides a stationary reference viewing envelope for a visual pin attached to the chamber pushrod or clevis. If the pin is within the reference envelope when the brake is applied, the system is operating within acceptable limits. Another example is provided in U.S. Pat. No. 6,135,242 to Hockley, which discloses a device similar to the Thibodeau '385 patent, but contains a lubricated clevis pin. Another example is provided in U.S. Pat. No. 6,019,197 to Judson, where a grommet is attached to the pushrod and seals the housing when the chamber is at zero stroke. The grommet is also a visual indicator of the system being out of adjustment when the brakes are applied and the grommet has traveled beyond the visual reference.

There are several problems and/or difficulties with the prior art devices and systems illustrated in the above patents. One is that the reference location is often in an obscure location underneath the vehicle making it difficult for the inspector to see if the system is operating within tolerance. In addition, several of the devices and systems of the above patents require the user to be at a certain viewing angle so that a true measurement is observed.

Furthermore, the prior art indicators and reference brackets are often exposed to the environment and in snowy or muddy climates when road slush or grime is kicked up. As a result, the stationary brackets serve as a collecting spot for ice and other debris. This can then obscure the inspector's view or even bend the bracket such that false readings are provided. Such environmental buildup may also damage other parts of the indication system.

A need exists for a brake chamber stroke indicator system and method that addresses the above issues.

DETAILED DESCRIPTION OF EMBODIMENTS

Figure 1:
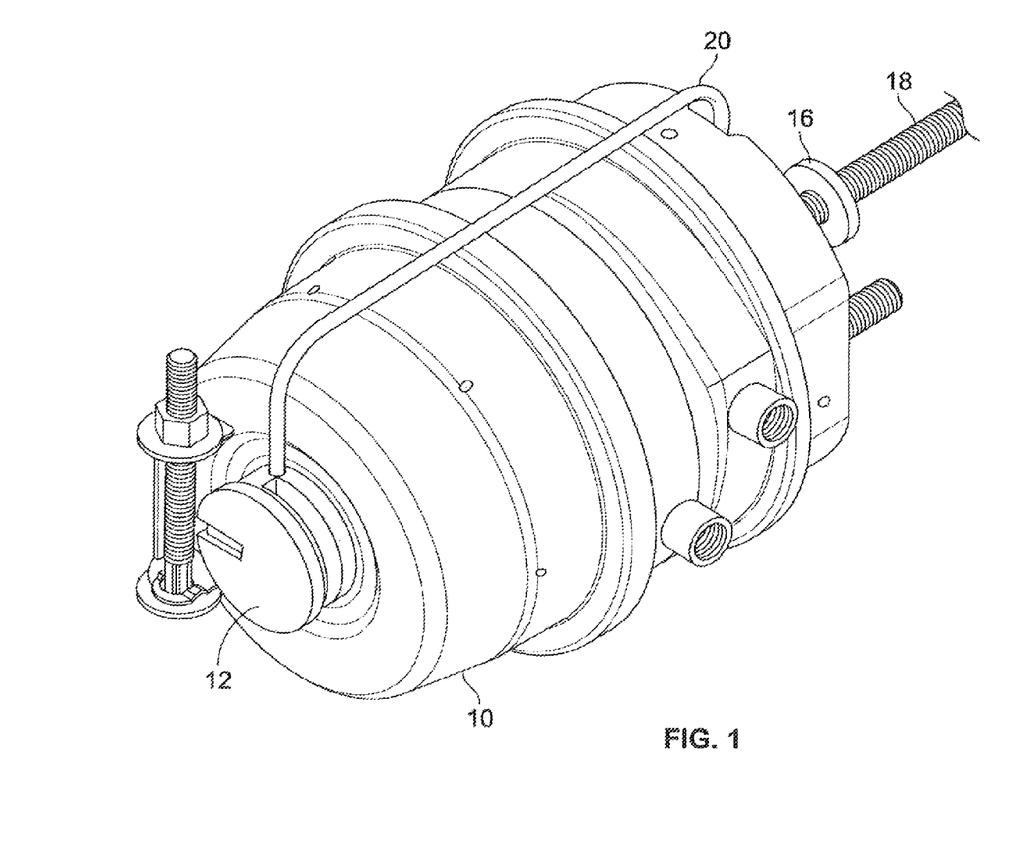
FIG. 1 is a perspective view of a brake system air chamber equipped with an embodiment of the stroke indicator system of the present invention.

As illustrated in FIG. 1, and in accordance with the present invention, an embodiment of the stroke indicator system of the invention is installed on a brake system air chamber 10. More specifically, a string pot gauge 12 is mounted in a position on the brake air chamber so that it may be easily viewed when the air chamber is installed on a vehicle, such as a heavy truck.

Figure 2A:
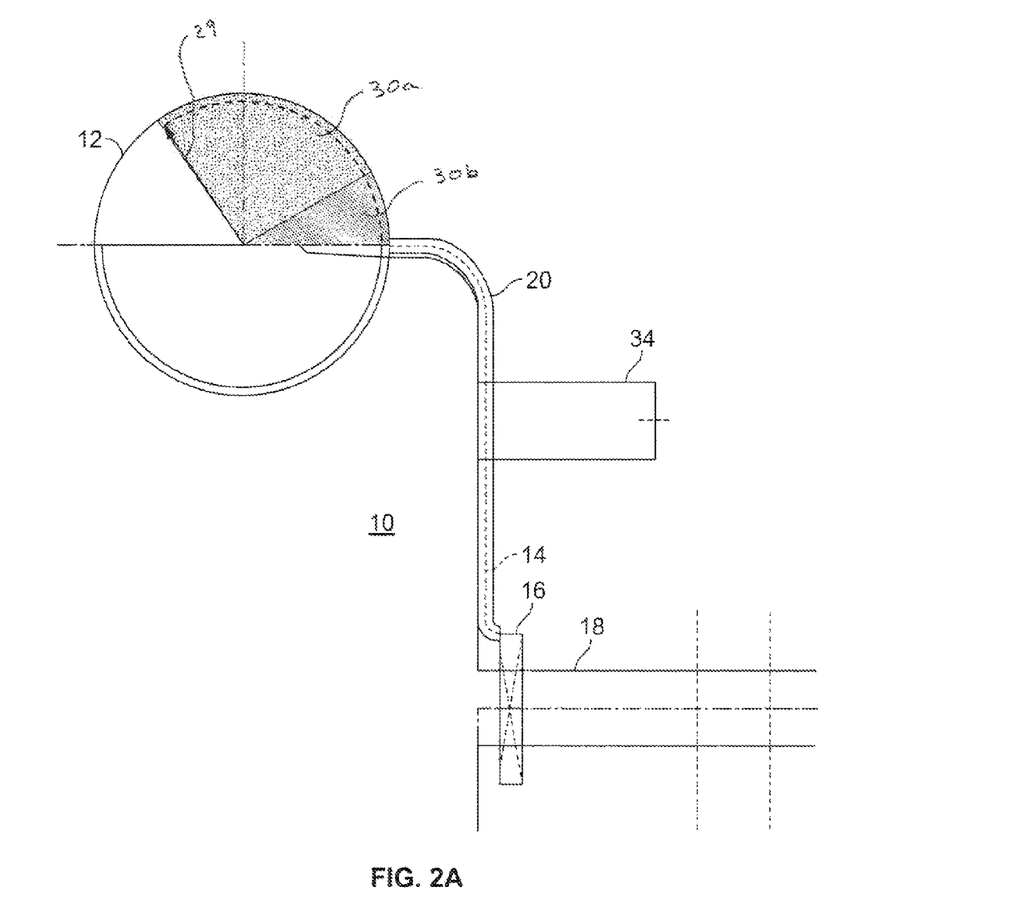
FIGS. 2A-2C are schematic views of a first embodiment of a string pot gauge and the air chamber housing of FIG. 1.
Figure 2B:
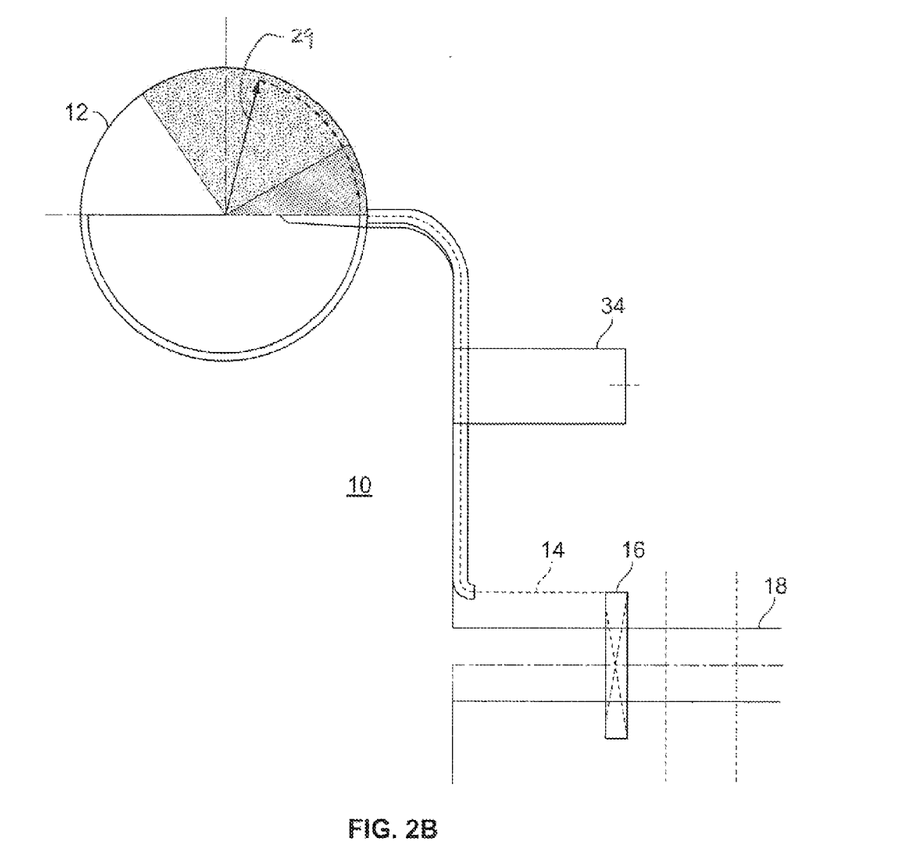
Figure 2C:
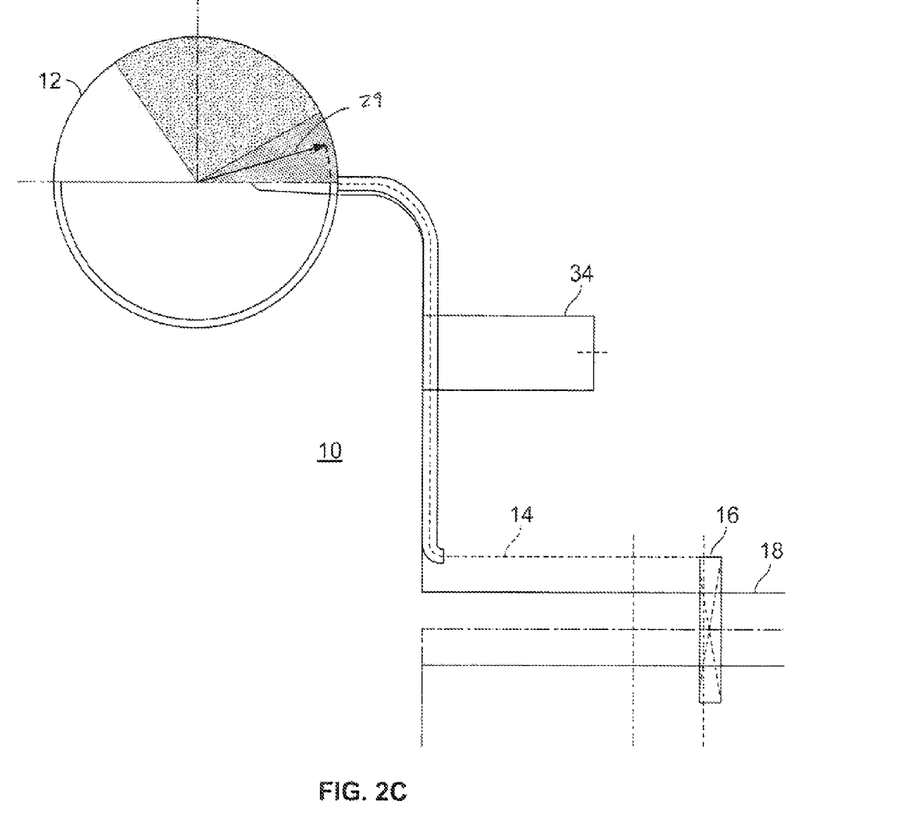

As the name implies, the string pot gauge 12 of FIG. 1 operates like a simple string pot. An abrasion and chemical resistant filament, indicated at 14 in FIGS. 2A-2C, is preferably used as the string.

With reference to FIGS. 1 and 2A-2C, one end of the string 14 is securely attached to a clamp 16 that is either mounted directly to the pushrod (18 in FIGS. 1 and 2A-2C) or to the pushrod clevis if no pushrod is available for clamping. The string 14 is run through a small diameter pipe or tube 20 attached to the string pot gauge 12 which, as explained below, serves as a meter or visual sight gage.

The location of the end of the pipe or tube 20, where the string connects to the pushrod or clevis, must be such that the string is kept within a certain parallelism to the rod 18 such that the linear travel can be properly accounted for on the string pot gauge. This is achieved most easily by using a small bracket that is attached to the chamber mounting stud (indicated at 34 in FIGS. 2A-2C). This can also be achieved internal to the chamber and thereby negating the need for external bracketing.

Figure 3A:
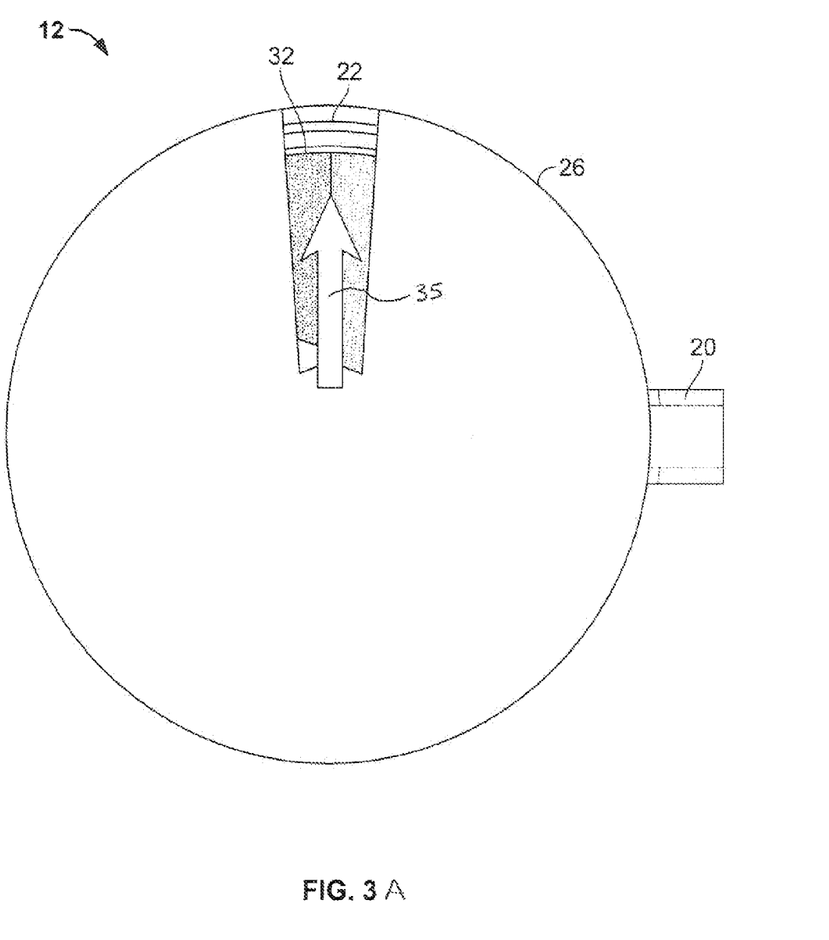
FIG. 3A is a front elevational view of a second embodiment of the string pot gauge of the present invention.
Figure 3B:
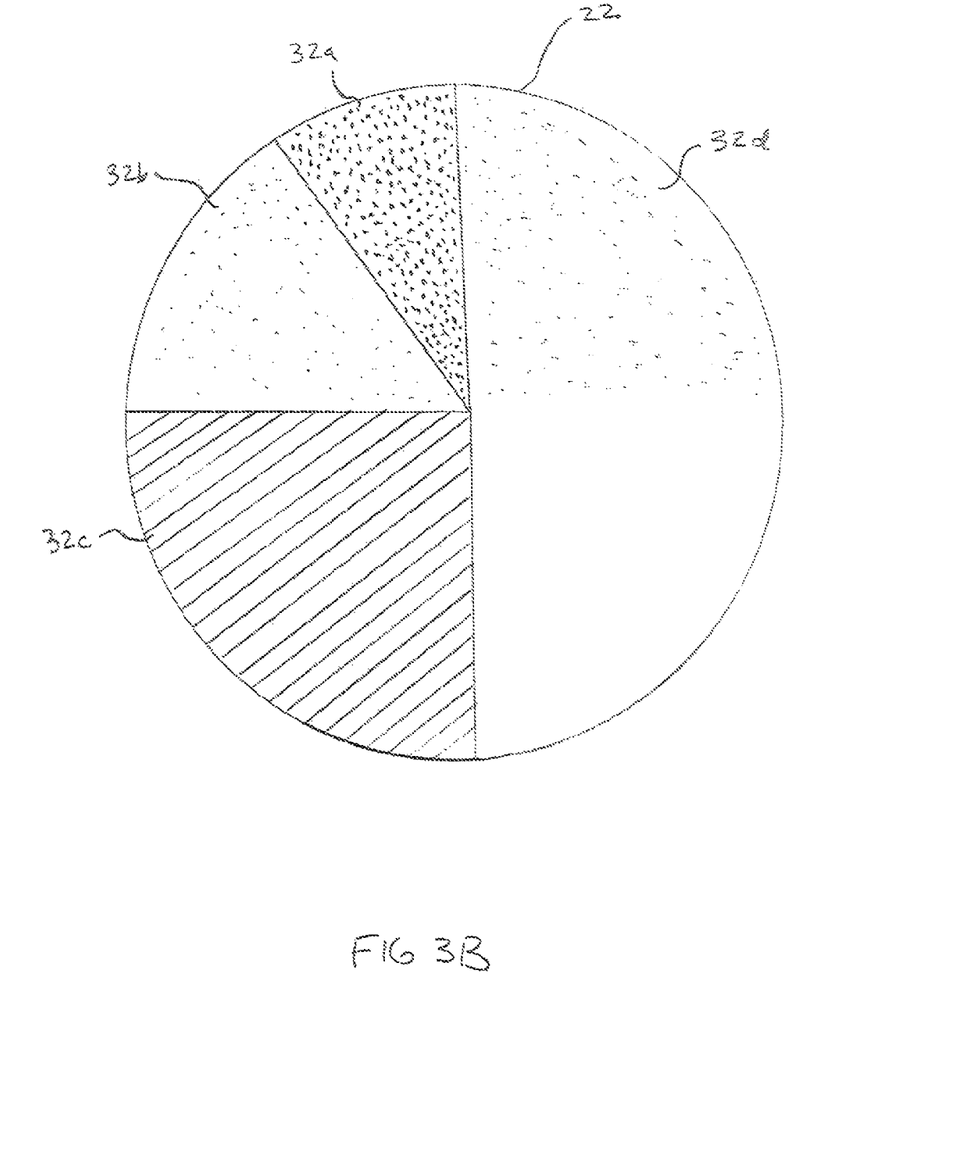
FIG. 3B is a front elevational view of the disc of the string pot gauge of FIG. 3A.
Figure 4:
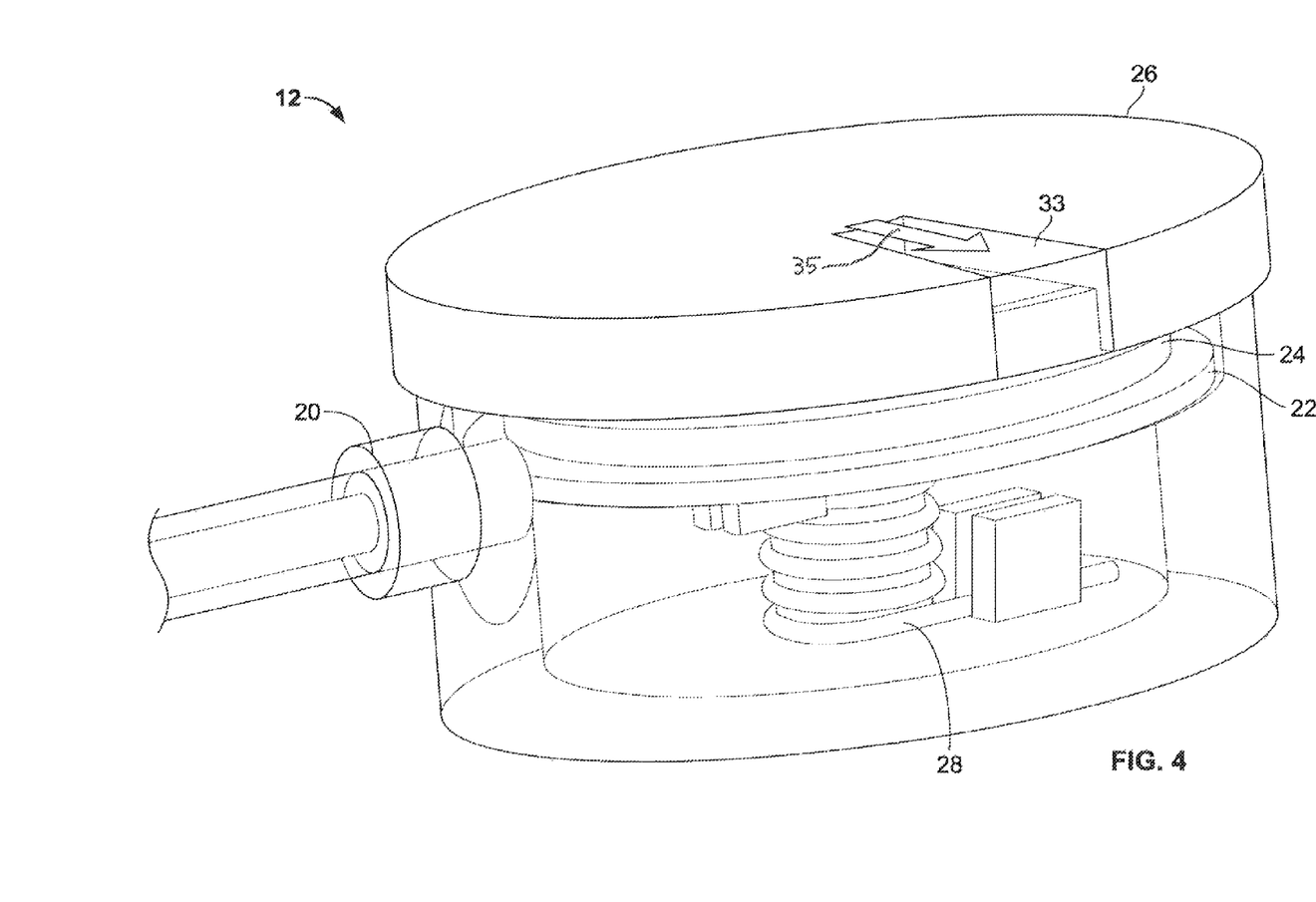
FIG. 4 is a perspective, partially transparent view of the string pot gauge of FIGS. 3A and 3B.

With reference to FIGS. 3 and 4, the other end of the string is attached to an indicator such as a disc or wheel 22 and held in place by a groove 24 to aid in guiding the string. The disc 22 has an axial and rotating attachment to the gage housing 26 such that when the string is pulled, the disc 22 rotates. To retract the string and keep some tension in the line, a small torsion spring 28 is anchored to the disc and gage housing.

A first embodiment of the string pot gauge 12 is shown in FIGS. 2A-2C. In this embodiment, the indicator includes a pointer 29 that is mounted to the disc 22, or is axially and rotatably attached directly to the gage housing 26 (FIGS. 3A and 4) in place of disc 22, in such a matter as to extend over the outer surface of the gauge housing. With reference to FIGS. 2A-2C, the surface of the gage housing is provided with colored zones 30a and 30b. As an example, zone 30a may be colored green, while zone 30b is colored red.

As a result, as illustrated in FIGS. 2A-2C, the pointer 29 of the strong pot gauge 12 will reflect the position of the brake push rod as the string 14 is extended out of the tube 20. If the pointer 29 remains in the green zone 30a both when the brakes are not applied and applied, as illustrated in FIGS. 2A and 2B, the braking system is operating normally and is not in need of adjustment or repair. If the pointer 29 travels into the red zone 30b when the brakes are applied, however, as illustrated in FIG. 2C, the braking system is in need of repair or adjustment.

Alternatively, in a second embodiment of the string pot 12, visual indications (either colored or numeric or some other means) 32 are on the rotating disc face, as illustrated in FIGS. 3A-5C. These markings correlate to the amount of linear travel seen by the string as it gets pulled during the actuation of the brake chamber. More specifically, with reference to FIG. 3B, the disc 22 may feature a first colored zone 32a, a second colored zone 32b, a third colored zone 32c and a forth colored zone 32d. As an example only, zone 32a may be green, zones 32b and 32d may be yellow and zone 32c may be red. With reference to FIGS. 3A and 4, a window or notch featuring an arrow 35 is formed in the housing 26 and permits the visual indications 32 to be viewed by a user.

Figure 5A:
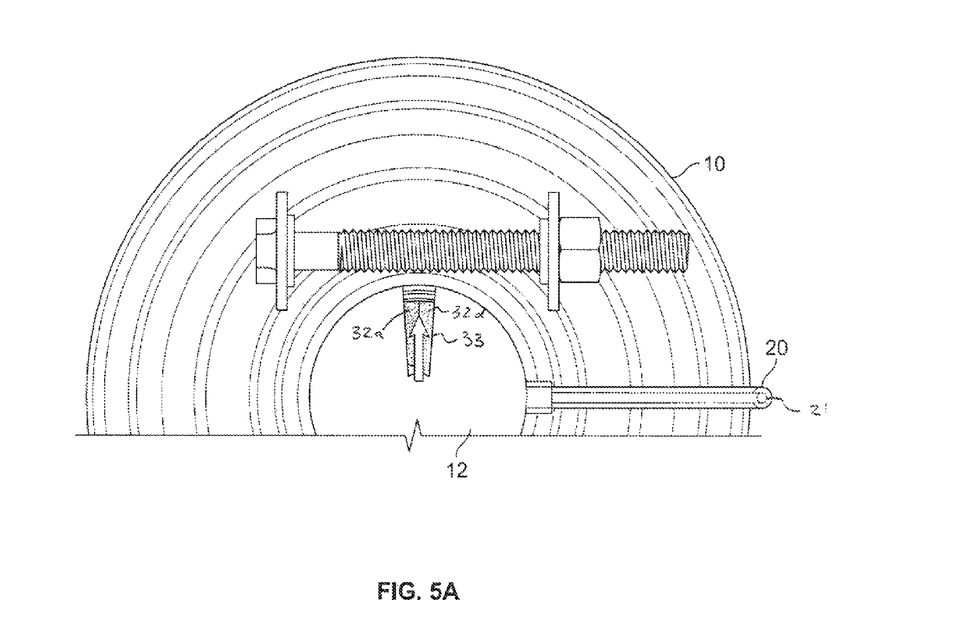
FIGS. 5A-5D illustrate the string pot gauge and brake push rod of FIGS. 3A-4 at zero stroke, mid stroke, full stroke and full stroke and in need of adjustment conditions, respectively.

In operation, FIG. 5A illustrates the situation or condition at zero stroke. In such a situation, the brake push rod 18 is not actuated so as to extend out of the brake air chamber 10, and the window 33 of the string pot 12 displays color zones 32a (green) and 32d (yellow).

Figure 5B:
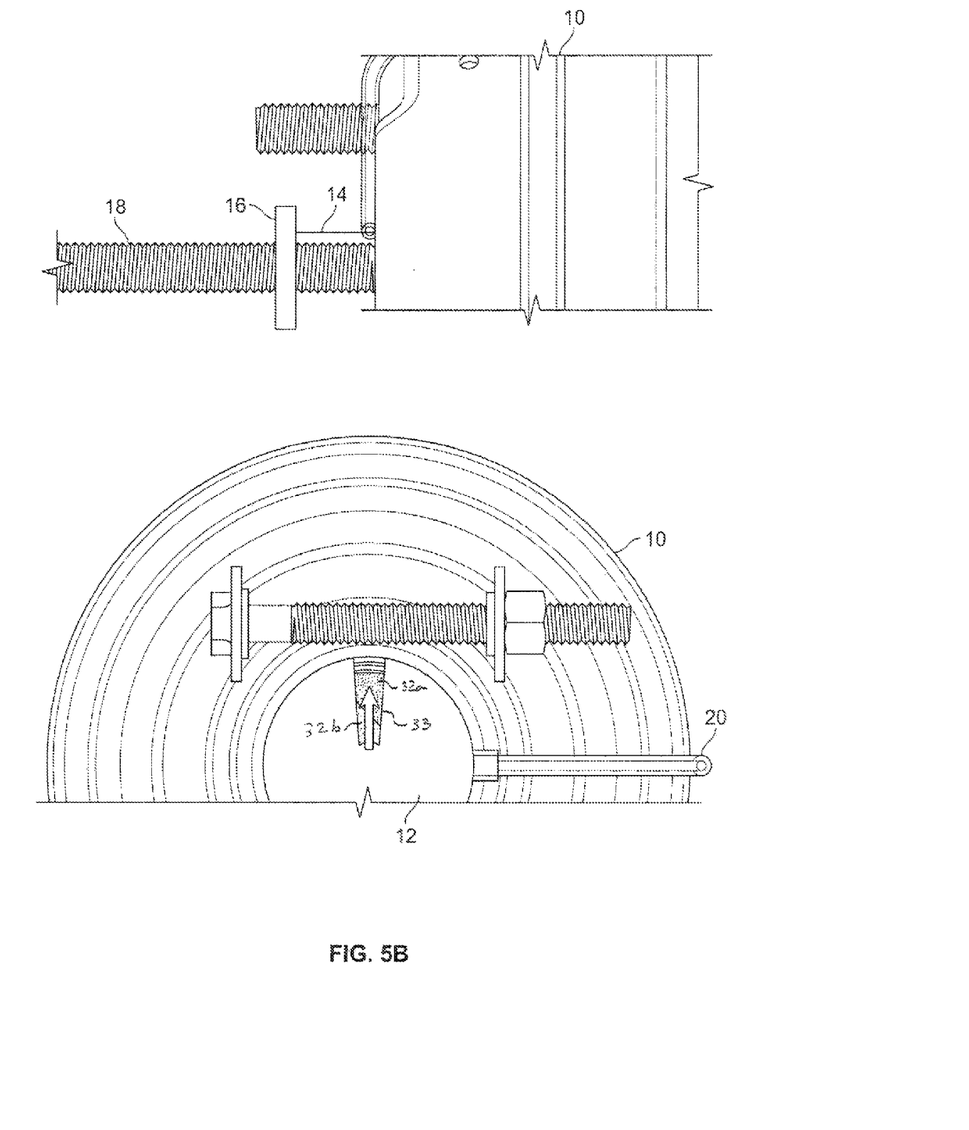

The situation or condition where the brake push rod 18 is at mid-stroke is illustrated in FIG. 5B, where the disc 22 of FIG. 3B has been rotated clockwise by the string 14 being extended as the brake push rod 18 extends out of the brake air chamber 10. In such a condition, widow 33 of the string pot displays a portion of zones 32a (green) and 32b (yellow).

Figure 5C:
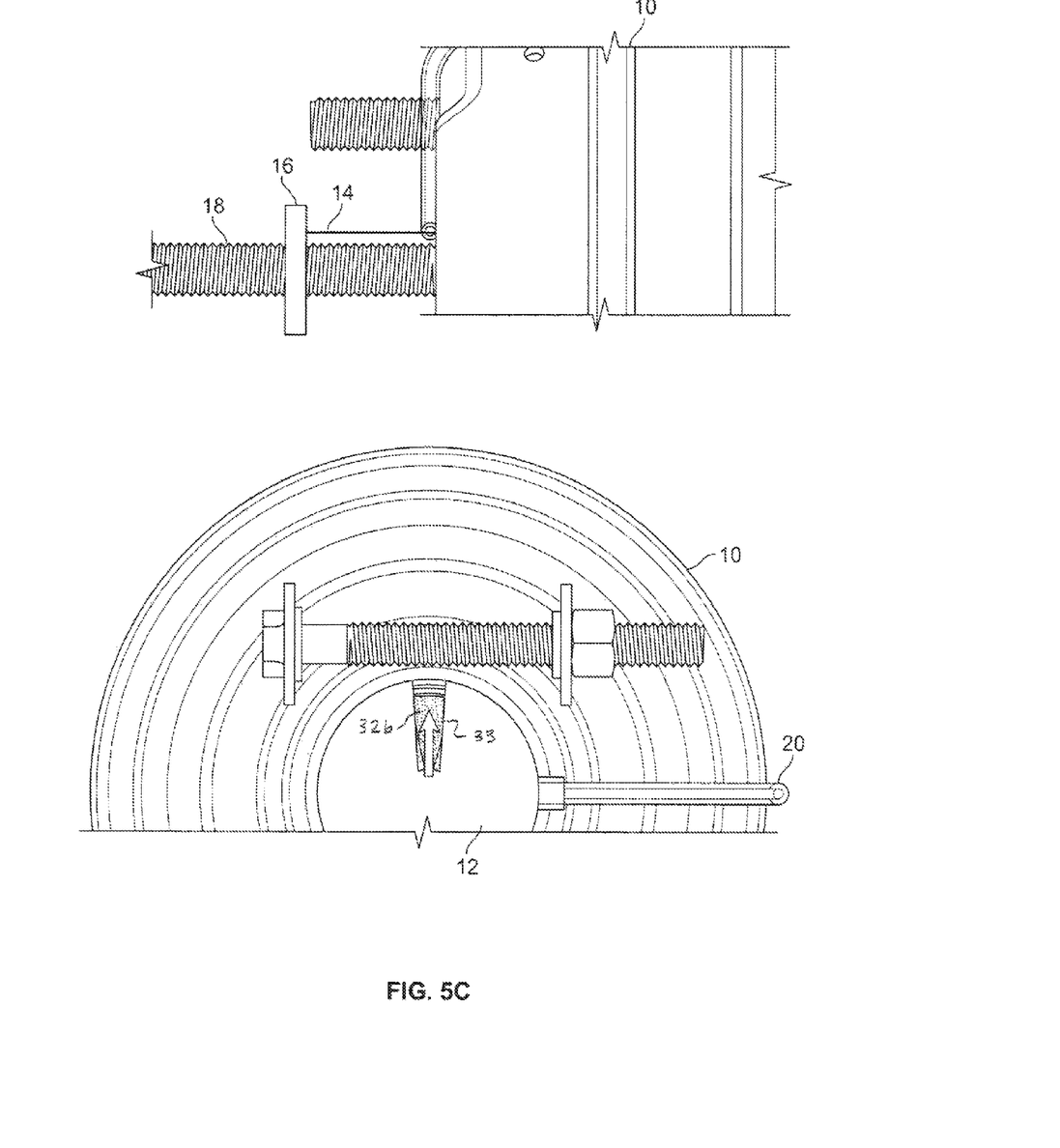

The situation or condition where the brake push rod 18 is at full stroke is illustrated in FIG. 5C, where the disc 22 of FIG. 3B has been further rotated clockwise by the string 14 being further extended as the brake push rod 18 fully extends out of the brake air chamber 10. In such a condition, widow 33 of the string pot fully displays zone 32b (yellow).

Figure 5D:
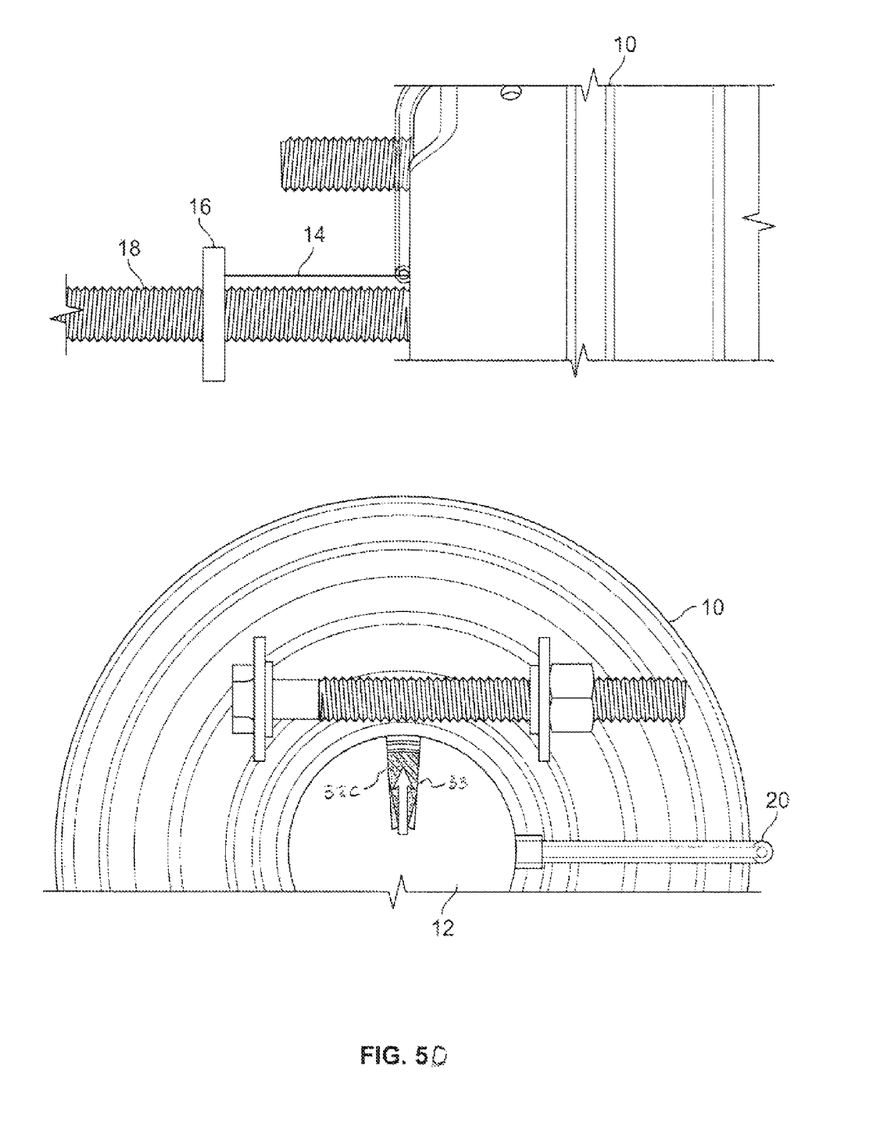

The situation or condition where the brake push rod 18 is at full stroke and adjustment of the brake system is needed is illustrated in FIG. 5D. In this condition, the disc 22 of FIG. 3B has been further rotated clockwise so that zone 32c (red) is displayed in the window 33 of the string pot 12.

The string pot gauge 12 of the embodiments of the invention described above minimizes the amount of road debris that will build up as the stationary parts of the system have minimal cross sections and the string 14 is wiped clean upon retraction via the circumferential edge and sizing of the opening 21 (FIG. 5A) in the distal end of the pipe or tube 20. The reference location is also protected and away from the actual travel of the rod. The above embodiment of the invention also offers the inspector the ability to "view" the status of the system at any easily accessible location including, but not limited to the side of the truck or trailer, the axle or any other location what would make inspecting the stroke of the chamber more ergonomic and reliable.

Figure 6A:
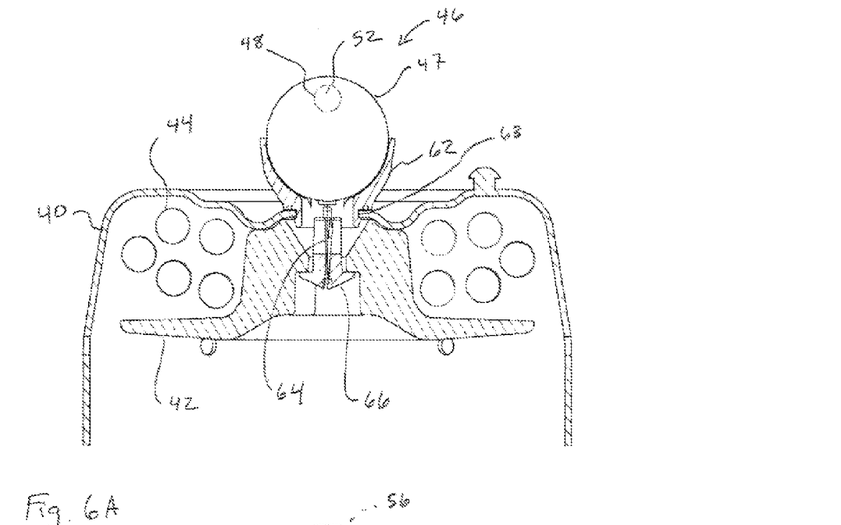
FIGS. 6A and 6B are cross sectional views of a portion of a parking chamber and a parking spring and a front elevational view of a string pot gauge illustrating a second embodiment of the stroke indicator system of the present invention at zero stroke and full stroke and in need of adjustment conditions, respectively.
Figures 6B, 7:
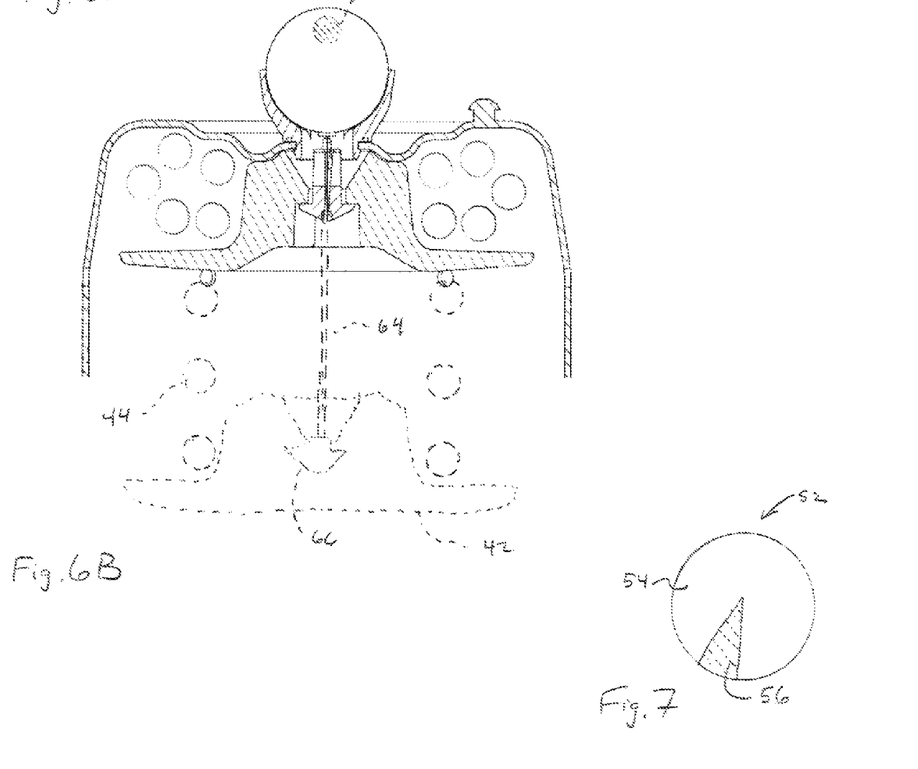
FIG. 7 is a front elevational view of the disc of the string pot gauge of FIGS. 6A and 6B.

A second embodiment of the invention is illustrated in FIGS. 6A, 6B and 7. This embodiment monitors the parking or emergency spring stroke of a pneumatic spring brake actuator. More specifically, a parking chamber housing is indicated at 40 in FIGS. 6A and 6B. As is known in the art, a top plate or pressure plate 42, which is positioned on top of a push rod (not shown) is positioned within the parking chamber defined by the parking chamber housing. A main spring or an emergency or parking compression spring 44 is positioned between the top plate 42 and the parking chamber housing 40. A retractor device or string pot gauge, indicated in general at 46, has housing 47 and a construction similar to the string pot gauge 12 of FIG. 4, with the exception that there is no pipe or tube (20 in FIG. 4) connected to string pot gauge housing 47. The string pot gauge 46 features a window opening 48 through which a rotatable disc 52 may be viewed.

As illustrated in FIG. 7, the disc 52 has light colored or unmarked portion 54 (for example, white) and a portion that includes an indicator sticker or marking 56 which may be, for example, black.

As shown in FIGS. 6A and 6B, the string pot gauge housing 47 snaps into a plug 62. The plug 62 snaps into the central opening 63 of the housing. A string 64 is attached to the disc 52 and extends out of the housing 47 so that the disc 52 rotates as the string 64 is pulled away from the housing 47. The string is provided with a fitting 66 that has similar geometry to a brake chamber release bolt that allows it to fit into the top plate 42 as if one was manually releasing the brake.

As illustrated in phantom in FIG. 6B, the when the string 64 is pulled past a certain distance, the viewing window 48 shows completely black (i.e. marking 56 of FIG. 7 is visible). This indicates to an operator that the brake system needs to be inspected for repair or adjustment. As with the spring pot gauge of FIG. 4, a spring within the housing 47 helps to re-wind the string when the parking brake is released. This spring also keeps tension in the line so that the fitting 66 doesn't fall out of the pressure plate 42 receptacle. The line or string 64 is preferably made from an aramid fiber to aid in durability and abrasion resistance.

The embodiment of FIGS. 6A, 6B and 7 allows for the inspection of brake stroke on disc brake systems. In addition, it provides for fast installation due to few parts and typically provides easy viewing due to location of brake chambers.

Figure 8A:
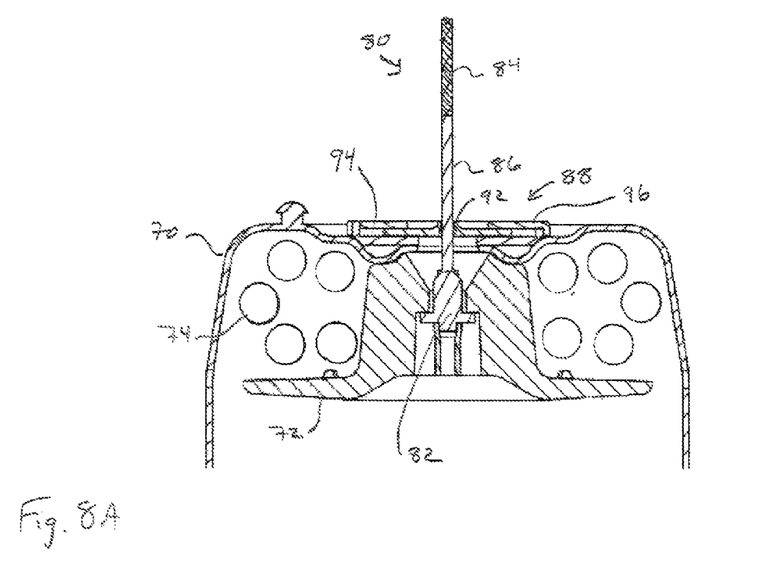
FIGS. 8A and 8B are cross sectional views of a portion of a parking chamber and a parking spring and a front elevational view of an indicator rod in a third embodiment of the stroke indicator system of the present invention at zero stroke and full stroke and in need of adjustment conditions, respectively.
Figure 8B:
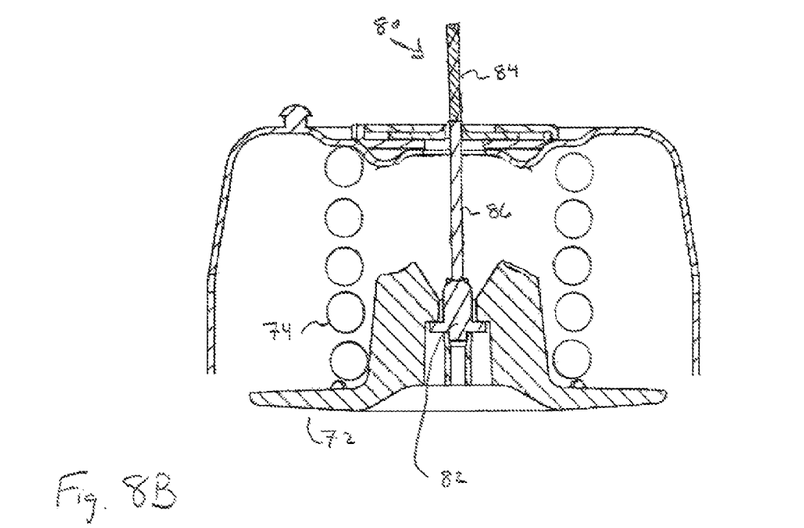
Figure 9:
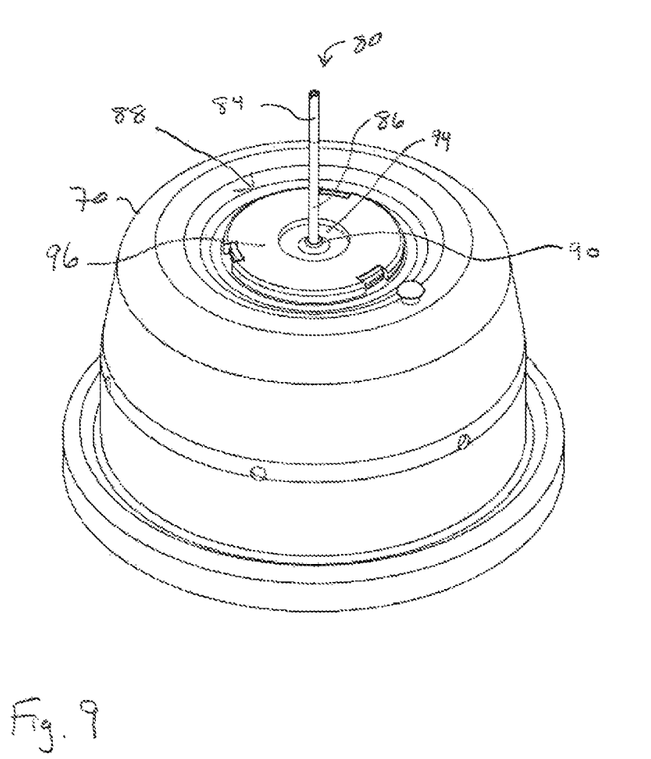
FIG. 9 is a perspective view of the parking chamber and indicator rod of FIG. 8A.

A third embodiment of the invention is illustrated in FIGS. 8A, 8B and 9. Like the embodiment of FIGS. 6A, 6B and 7, this embodiment monitors the parking or emergency spring stroke of a pneumatic spring brake actuator. More specifically, a parking chamber housing is indicated at 70 in FIGS. 8A and 8B. As is known in the art, a top plate or pressure plate 72, which is positioned on top of a push rod (not shown) is positioned within the parking chamber defined by the parking chamber housing. A main spring or an emergency or parking compression spring 74 is positioned between the top plate 72 and the parking chamber housing 70.

As illustrated in FIGS. 8A, 8B and 9, an indicator rod, indicated in general at 80, is positioned in the parking chamber defined by housing 70. The indicator rod may take the form of a modified release tool bolt. This indicator rod 80 has a base 82 at the bottom consisting of a spring material, such as rubber, to keep the bolt in contact with the pressure plate 72. The top portion of the indicator has a portion 84 that features an applied sticker or other marker to differentiate it from the middle portion 86. For example, the marker may be a dark colored sticker, while the middle portion 86 is a light color.

A shield assembly, indicated in general at 88 in FIGS. 8A and 9 having a central opening 92 is put over the rod and then adhered to the parking chamber housing 70 via an adhesive coating (that may be provided with the rod).

When the brakes are fully released, the operator determines where the rod should be marked to indicate that adjustments need to be made, such as a predetermined distance above the location where the rod passes through the opening 90 of shield assembly 88. The operator then applies the marker at the appropriate position on the rod to designate the marker portion 84. As the brakes are applied, the rod travels downward. If the marker portion 84 is the only thing visible, as illustrated in FIG. 8B, then adjustment or repair of the braking system needs to take place.

To accommodate for possible spring (74) shifting inside the unit, the shield assembly 88 has a sliding disc 94 under an annular member 96 that is secured to the housing, such as by adhesive, and allows the rod to always be in line with the spring center and shift if necessary.

The rod is preferably made of a high strength material so as to not bend or break if road debris hits the unit. The rod preferably does not stick out more than a standard release tool would thereby ensuring enough room on all setups.

If for some reason the brake needs to be manually released, the shield assembly 88 can be disassembled thanks to its snap fit design and a standard release tool can fit inside the opening.

The embodiment of FIGS. 8A, 8B and 9 allows for the inspection of brake stroke on disc brake systems. It also provides for fast installation due to few parts and is adjustable by the end user.

In addition, the ability to transfer useful stroke information away from the actual point of movement opens up many more possible embodiments to the remote viewing of the chamber stroke. Some of these embodiments include the incorporation of electronic sensors, light diffraction, and the manipulation of simple harmonics.

While the preferred embodiments of the invention have been shown and described, it will be apparent to those skilled in the art that changes and modifications may be made therein without departing from the spirit of the invention, the scope of which is defined by the appended claims.

What is claimed is:

1. A brake chamber stroke indicator system for a brake system including a brake air chamber and a brake push rod comprising:
   a) a string pot gauge including:
      I. a housing;
      II. an indicator rotatably positioned within said housing;
      III. a string having a first end and a second end, where the first end of the string is attached to the indicator;
      IV. a spring urging the indicator to rotate in a first direction whereby the string is retracted into the housing;
   b) said second end of said string adapted to be attached to the brake push rod;
   c) a tube adapted to be attached in a position between the string pot gauge and said second end of the string and at least partially adjacent to the brake push rod;
   wherein the tube is attached to the housing of the string pot gauge and the tube features an opening sized to wipe debris off of the string when the string is retracted into the housing.

2. The brake chamber stroke indicator system of claim 1 wherein the indicator includes a pointer.

3. The brake chamber stroke indicator system of claim 1 wherein the indicator includes a disc.

4. The brake chamber stroke indicator system of claim 3 wherein the disc includes visual indications.

5. The brake chamber stroke indicator system of claim 4 wherein the housing includes a window or notch so that the visual indications may be viewed by a user.

6. The brake chamber stroke indicator system of claim 5 wherein the visual indications include colored zones.

7. The brake chamber stroke indicator system of claim 1 wherein the string is an abrasion and chemical resistant filament.

8. The brake chamber stroke indicator system of claim 1 wherein the spring is a torsion coil spring.

9. The brake chamber stroke indicator system of claim 1 further comprising a clamp adapted to secure the second end of the string to the brake push rod.

10. A brake chamber stroke indicator system comprising
    a) an brake air chamber;
    b) a brake push rod connected to the brake air chamber;
    c) a string pot gauge including:
       I. a housing attached to the brake air chamber;
       II. an indicator rotatably positioned within said housing;
       III. a string having a first end and a second end, where the first end of the string is attached to the indicator;
       IV. a spring urging the indicator to rotate in a first direction whereby the string is retracted into the housing;
    d) said second end of said string attached to the brake push rod;
    e) a tube attached to the brake air chamber in a position between the string pot gauge and said second end of the string and at least partially adjacent to the brake push rod;
    wherein the tube is attached to the housing of the string pot gauge and the tube features an opening sized to wipe debris off of the string when the string is retracted into the housing.

11. The brake chamber stroke indicator system of claim 10 wherein the indicator includes a pointer.

12. The brake chamber stroke indicator system of claim 10 wherein the indicator includes a disc.

13. The brake chamber stroke indicator system of claim 12 wherein the disc includes visual indications.

14. The brake chamber stoke indicator system of claim 13 wherein the housing includes a window or notch so that the visual indications may be viewed by a user.

15. The brake chamber stroke indicator system of claim 10 wherein the string is an abrasion and chemical resistant filament.

16. The brake chamber stroke indicator system of claim 10 wherein the spring is a torsion coil spring.

17. The brake chamber stroke indicator system of claim 10 further comprising a clamp securing the second end of the string to the brake push rod.

18. The brake chamber stroke indicator system of claim 10 wherein the tube is attached to the housing of the string pot gauge.

19. A brake chamber stroke indicator system for a brake system including a brake chamber housing and a pressure plate with a compression spring positioned there between comprising:
   a) an indicator rod having a base adapted to be attached to the pressure plate;
   b) said indicator rod including a marker portion positioned so that only the marker portion protrudes from the parking chamber housing when the brake system requires repair or adjustment;
   a shield assembly including an annular member adapted to be attached to the brake chamber housing and a sliding disc positioned between the annular member and the brake chamber housing, said sliding disc including an opening through which the indicator rod is adapted to pass.

20. The brake chamber stroke indicator system of claim 19 wherein the marker portion includes a sticker.

21. The brake chamber stroke indicator system of claim 19 wherein the base includes a spring material.

22. A brake chamber stroke indicator system comprising:
   a brake having a housing with an air chamber housing side and a parking brake chamber housing side;
   a brake push rod extending from the air chamber housing side and configured to actuate the brake;
   a pressure plate disposed on the push rod;
   a parking compression spring positioned between the pressure plate and the parking brake chamber housing side; and
   a brake chamber stroke indicator that is coupled to the pressure plate and extends out of the parking brake chamber housing side, wherein the brake chamber stroke indicator has markings thereon;
   wherein the markings on the brake chamber stroke indicator are configured to indicate stroke of the parking compression spring to the operator to thereby indirectly indicate stroke of the brake push rod to the operator.

23. The brake chamber stroke indicator system according to claim 22, wherein the brake chamber stroke indicator comprises a rod.

24. The brake chamber stroke indicator system according to claim 23, wherein the rod is part of a release tool bolt.

25. The brake chamber indicator system according to claim 23, wherein the rod has a top portion, a bottom portion and a middle portion between the top portion and the bottom portion, wherein the top portion comprises a marker that differentiates the top portion from the middle portion.

26. The brake chamber stroke indicator system according to claim 25, wherein the rod has a bottom portion comprising a spring material configured to keep the rod in contact with the pressure plate.

27. The brake chamber stroke indicator system according to claim 23, further comprising a shield comprising a central opening through which the rod extends, wherein the shield is coupled to the parking brake chamber housing side.

28. The brake chamber stroke indicator system according to claim 27, further comprising an annular member coupled to the parking chamber housing side and a sliding disc disposed under the annular member that allows the rod to shift and thus remain in-line with a center of the parking compression spring.

* * * * *